United States Patent
Kernozicky et al.

(10) Patent No.: US 8,122,601 B2
(45) Date of Patent: Feb. 28, 2012

(54) METHODS FOR CORRECTING TWIST ANGLE IN A GAS TURBINE ENGINE BLADE

(75) Inventors: Garrett Kernozicky, Mansfield, CT (US); Ephraim C. Davis, No Richland Hills, TX (US); Thomas P. Cap, Simsbury, CT (US); Paul Balko, Shelton, CT (US)

(73) Assignee: United Technologies Corporation, Hartford, CT (US)

( * ) Notice: Subject to any disclaimer, the term of this patent is extended or adjusted under 35 U.S.C. 154(b) by 945 days.

(21) Appl. No.: 12/082,864

(22) Filed: Apr. 15, 2008

(65) Prior Publication Data
US 2009/0255114 A1 Oct. 15, 2009

(51) Int. Cl.
*B23P 6/00* (2006.01)
(52) U.S. Cl. .................... 29/889.1; 29/402.01
(58) Field of Classification Search ............... 29/889.1, 29/402.01
See application file for complete search history.

(56) References Cited

U.S. PATENT DOCUMENTS

| | | | |
|---|---|---|---|
| 3,653,128 A | 4/1972 | Palmenberg | |
| 4,146,967 A | 4/1979 | Rohner et al. | |
| 4,454,656 A | 6/1984 | Arrigoni | |
| 4,639,991 A | 2/1987 | Sharon | |
| 4,856,943 A | 8/1989 | Nelson et al. | |
| 4,866,828 A | 9/1989 | Fraser | |
| 4,908,782 A | 3/1990 | Pekarek et al. | |
| 4,951,390 A * | 8/1990 | Fraser et al. | 29/889.1 |
| 5,063,662 A | 11/1991 | Porter et al. | |
| 5,162,659 A | 11/1992 | Diamond et al. | |
| 5,625,958 A | 5/1997 | DeCoursey et al. | |
| 5,771,726 A | 6/1998 | Bibby et al. | |
| 6,209,216 B1 | 4/2001 | Bear | |
| 6,370,752 B1 * | 4/2002 | Anderson et al. | 29/402.11 |
| 6,449,565 B1 * | 9/2002 | Budrow et al. | 702/42 |
| 6,792,655 B2 | 9/2004 | Wah | |
| 6,959,572 B2 | 11/2005 | Lawrence et al. | |
| 7,469,452 B2 * | 12/2008 | Garrett | 29/23.51 |
| 2007/0031259 A1 * | 2/2007 | Dube et al. | 416/193 A |
| 2007/0084048 A1 * | 4/2007 | Gosling et al. | 29/889.1 |
| 2007/0084050 A1 | 4/2007 | Davis et al. | |
| 2007/0169860 A1 * | 7/2007 | Groh | 148/675 |
| 2007/0237644 A1 * | 10/2007 | Suzuki et al. | 416/220 R |
| 2009/0000102 A1 * | 1/2009 | Willis et al. | 29/402.21 |

* cited by examiner

*Primary Examiner* — David Bryant
*Assistant Examiner* — Moshe Wilensky
(74) *Attorney, Agent, or Firm* — Kinney & Lange, P.A.

(57) ABSTRACT

A method of correcting a twist angle of a gas turbine engine blade includes measuring an existing twist angle of the blade, applying a first angular load to a first end of the blade; and measuring a repaired twist angle of the blade. The first angular load applied to the first end of the blade is based on an empirical correlation between a plurality of angular loads necessary to produce a plurality of twist angle correction values.

23 Claims, 3 Drawing Sheets

METHODS FOR CORRECTING TWIST ANGLE IN A GAS TURBINE ENGINE BLADE

STATEMENT OF GOVERNMENT INTEREST

The Government may have certain rights in this invention pursuant to Contract No. F33657-99-D-2051 awarded by the United States Air Force.

CROSS-REFERENCE TO RELATED APPLICATION(S)

The present application is related to the following copending applications filed on the same day as this application: "TURBINE BLADE TWIST ANGLE CORRECTION TOOLING" by inventors Ephraim C. Davis, Bryan G. and Parrette, Larry D. Cronin (U.S. application Ser. No. 12/082,896); and "METHOD FOR DEVELOPING A REPAIR PROCESS TO CORRECT A DEFORMED GAS TURBINE ENGINE COMPONENT" by inventors Garrett Kernozicky, Ephraim C. Davis, and Thomas P. Cap (U.S. application Ser. No. 12/082,865). All of these applications are incorporated herein by this reference.

BACKGROUND

The present invention relates to turbine blade repair procedures and tooling. In particular, the present invention relates to a method for correcting the twist angle of a gas turbine engine blade.

A gas turbine engine commonly includes a fan, a compressor, a combustor and a turbine. During engine operation, working medium gases, for example air, are drawn into the engine by the fan and directed into and compressed in the compressor. The compressed air is channeled to the combustor where fuel is added to the air and the air/fuel mixture is ignited. The products of combustion are discharged to the turbine section, which extracts work from these products to produce useful thrust to power, for example, an aircraft in flight.

The compressor and turbine commonly include alternating stages of rotor blades and stator vanes. Compressor and turbine blades and vanes often include complex, contoured airfoil geometries designed to optimally interact with the working medium gas passing through the engine. One common feature of airfoil geometries is the blade twist angle. The twist angle is the angular displacement of the airfoil about a spanwise axis, such as the stacking line, from the root to the tip of the airfoil. During normal engine operation, the blade twist angle feature, which is a critical characteristic of gas turbine engine blades, decreases due to thermo-mechanical cycling and aerodynamic loading of the blades. The twist angle must be restored to the original manufactured condition during engine overhaul prior to returning the blade to service.

Turbine blade twist correction is commonly accomplished by clamping the blade root in a fixture and manually applying a load to the tip of the blade using, for example a two-handed wrench configured to clamp the blade tip. An operator twists the blade using the wrench, measures the blade twist angle, and repeats the twisting procedure until the correct twist angle is reached. Because the operator can only estimate how much force to apply each time, this approach often requires many iterations to achieve the desired twist angle. This results in a time-consuming, labor-intensive and costly process. This approach can also result in over-twist due to applying excessive force. Over-twisting is particularly problematic in blades prone to micro-cracking, such as blades made from a directionally solidified nickel alloy.

Therefore, improved tools and methods for correcting blade twist angle are needed.

SUMMARY

A method of correcting a twist angle of a gas turbine engine blade includes measuring an existing twist angle of the blade, applying a first angular load to a first end of the blade; and measuring a repaired twist angle of the blade. The first angular load applied to the first end of the blade is based on an empirical correlation between a plurality of angular loads necessary to produce a plurality of twist angle correction values.

DETAILED DESCRIPTION

Figure 1A:
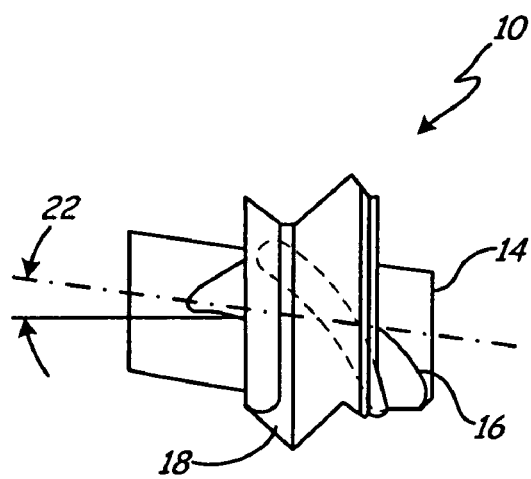
FIGS. 1A and 1B are top and side views respectively of a twisted gas turbine blade.
Figure 1B:
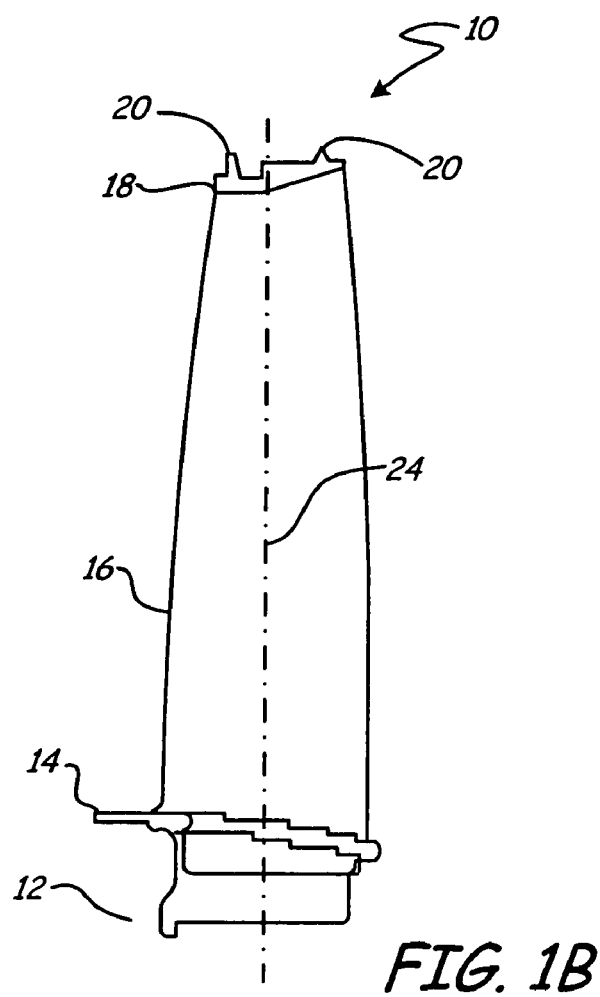

FIGS. 1A and 1B are top and side views respectively of twisted gas turbine blade 10, which includes shank 12, platform 14, airfoil 16, shroud 18, and knife edges 20. In FIGS. 1A and 1B, blade 10 is a gas turbine blade including a twisted airfoil 16 which may be corrected using methods according to the present invention. Blade 10 may be, for example, a shrouded high pressure turbine blade. Blade 10 includes shank 12, which may include a dovetail or fir tree root configured to be received in a slot in the rim of a rotor disc. Blade 10 also includes platform 14 integral with and radially outward of shank 12. Airfoil 16 of blade 10 extends radially from platform 14 to shroud 18. Shroud 18 includes knife edges 20 designed to engage, for example, a stationary honeycomb seal arranged radially outward of turbine blade 10 mounted in the rim of the rotor disc. Twist angle 22 of blade 10 is equal to the angular displacement of airfoil 16 about a spanwise line, such as stacking line 24 of airfoil 16, between platform 14 and shroud 18. During normal engine operation, twist angle 22 of blade 10 may decrease due to thermo-mechanical cycling and aerodynamic loading on blade 10. In order to extend the useful life of blade 10, twist angle 22 may be restored to the original manufactured condition during engine overhaul prior to returning blade 10 to service.

Figure 2:
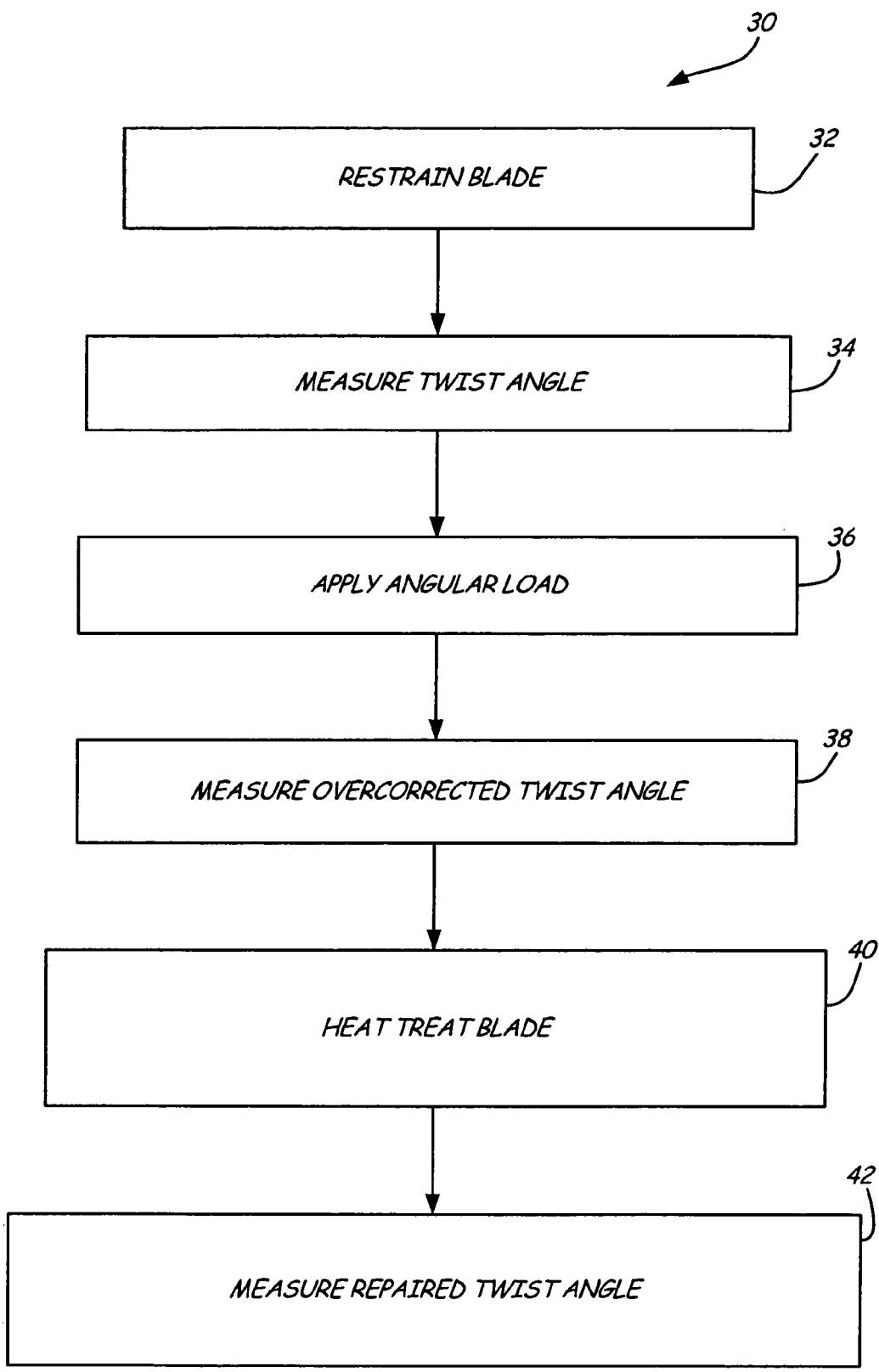
FIG. 2 is a flow chart illustrating a method according to embodiments of the present invention of correcting a twist angle of a gas turbine engine blade.

FIG. 2 is a flow chart illustrating method 30 according to embodiments of the present invention of correcting, for example, twist angle 22 of blade 10, which method 30 includes restraining the root of the blade (step 32), measuring an existing twist angle of the blade (step 34), applying a first angular load to the tip of the blade to produce an overcorrected twist angle in the blade (step 36), measuring an over-corrected twist angle of the blade (step 38), heat treating the blade to reduce residual stresses in the blade (step 40), and measuring a repaired twist angle of the blade (step 42). The first angular load applied to the tip of the blade (step 36) is based on an empirical correlation between a plurality of angular loads necessary to produce a plurality of twist angle correction values. Heat treating the blade (step 40) may act to reduce the overcorrected twist angle of the blade. The empirical correlation between a plurality of angular loads necessary to produce a plurality of twist angle correction values on which the first angular load is based may therefore account for the reduction in the overcorrected twist angle caused by heat treating the blade. The repaired twist angle is equal to the overcorrected twist angle reduced by heat treating the blade (step 40).

Method 30 includes restraining the root of the blade (step 32). For example, the blade, such as blade 10 shown in FIG. 1, may be restrained in a fixture configured to clamp the root of the blade. The fixture used to restrain the root of the blade (step 32) may be configured to receive different root geometries, such as dovetail and fir tree geometries commonly found in gas turbine engine blades. Method 30 also includes measuring an existing twist angle of the blade (step 34), which may be accomplished by, for example, using a twist angle gauge configured to engage one or more portions of the blade.

In addition to restraining the root of the blade (step 32) and measuring an existing twist angle of the blade (step 34), method 30 includes applying a first angular load to the tip of the blade to produce an overcorrected twist angle in the blade (step 36). Although method 30 has been described with reference to restraining the root and applying a load to the tip of the blade, embodiments of the present invention also include methods including the steps of restraining the tip and applying a load to the root of the blade. In FIG. 2, the first angular load applied to the tip of the blade (step 36) is based on an empirical correlation between a plurality of angular loads necessary to produce a plurality of twist angle correction values. The load applied to the blade represents the primary input of method 30 to repair the twist angle of the blade subjected to method 30. In order to achieve a repaired twist angle without necessitating arbitrary application of varying loads to iteratively twist the blade, method 30 includes applying a specific, i.e. the first, load to achieve a specific twist angle correction. The first load necessary to produce the overcorrected twist angle is determined based on an empirical correlation between a range of angular loads applied to produce a range of twist angle correction values.

The empirical correlation may be generated, for example, using the method described in the copending application entitled "METHOD FOR DEVELOPING A REPAIR PROCESS TO CORRECT A DEFORMED GAS TURBINE ENGINE COMPONENT" U.S. application Ser. No. 12/082,865). For example, the empirical correlation on which the first angular load applied to the blade (step 36) is based may be generated by determining analytically peak stress locations in a model of the turbine blade, applying a range of loads to sample blades based on the model to produce a range of twist angle correction values in the samples, generating data from the samples including the loads applied and the twist angle correction values produced, destructively analyzing the samples at the peak stress locations for structural imperfections, and correlating the loads applied to the twist angle correction values produced to determine a range of allowable loads necessary to produce a range of target geometrical correction values in a used blade substantially free of structural imperfections. The first angular load may be applied to the blade (step 36) by, for example, clamping and twisting the tip of the blade using a twist correction tool, such as a tool configured to clamp the blade tip geometry and to apply a measured angular load to twist the blade. The first angular load applied to the blade produces an overcorrected twist angle in the blade to, for example, account for repair process steps that may act to change, for example reduce, the twist angle correction after the first load has been applied.

In addition to applying a first angular load to the tip of the blade to produce an overcorrected twist angle (step 36), method 30 includes measuring an overcorrected twist angle of the blade (step 38), which measurement may be made, as with the existing twist angle measurement, using a twist angle gauge configured to engage one or more portions of the blade.

Figure 3:
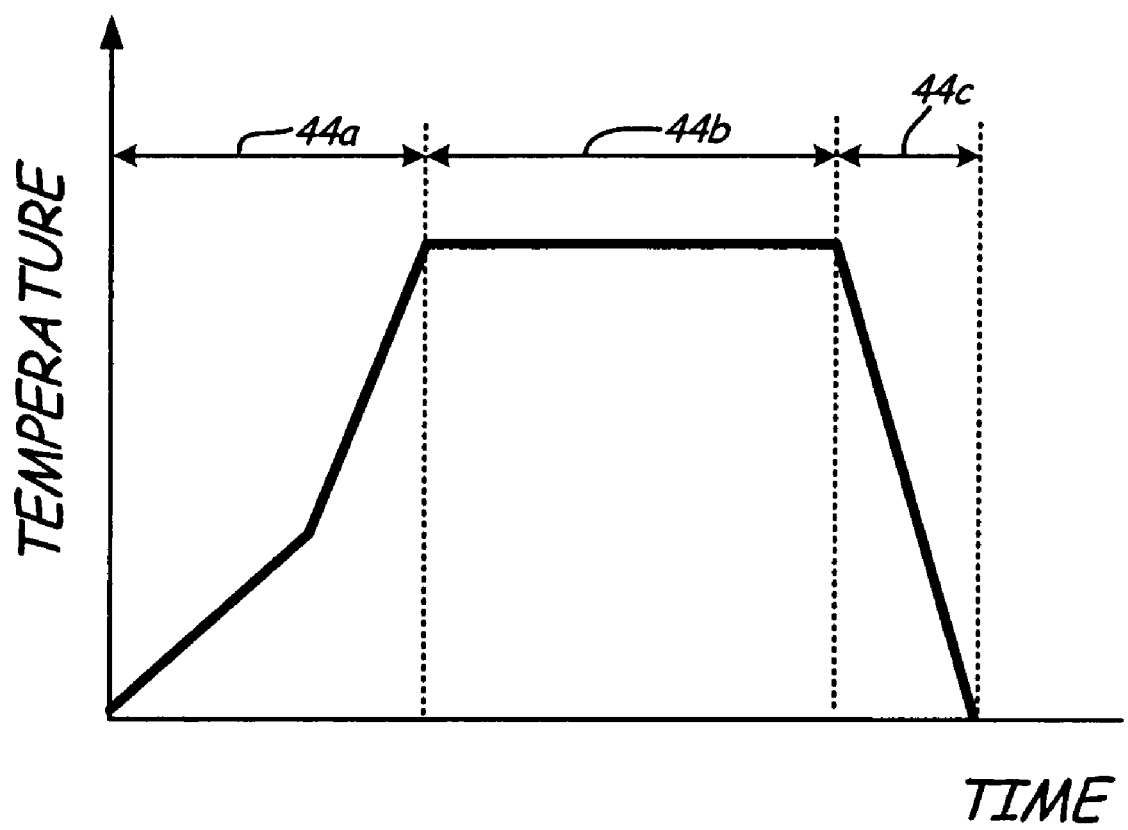
FIG. 3 is a graph showing a representative temperature versus time curve for the heat treating step of the method of FIG. 2.

Method 30 also includes heat treating the blade to reduce residual stresses in the blade (step 40). Heat treating the blade to reduce residual stresses may include subjecting the blade to a range of temperatures for a period of time. Applying the first angular load to the blade (step 36) to change the twist angle plastically deforms one or more portions of the blade. Plastically deforming the blade may act to create residual stresses in the blade, which residual stresses may reduce the effectiveness of the blade after being returned to service. For example, residual stresses produced by plastically deforming the blade during repair may structurally compromise portions of the blade such that the compromised blade may not be able to withstand the forces encountered during engine operation. In order to reduce the residual stresses, and thereby the associated deleterious effects of such stresses on the blade, the blade may be heat treated by, for example, heating the blade in a furnace at a range of temperatures for a period of time. FIG. 3 is a graph showing a representative temperature versus time curve for heat treating the turbine blade (step 40). In FIG. 3, the temperature the blade is subjected to increases for a first period of time 44a, remains substantially constant for a second period of time 44b, and decreases for a third and final period of time 44c. The specific range of temperatures the blade is subjected to during heat treatment and the time period over which the blade is subjected to such temperatures will vary depending on factors, such as the amount of plastic deformation, i.e. twist angle correction, produced in the blade and the materials, such as a directionally solidified nickel alloy, from which the blade is constructed.

In addition to reducing residual stresses in the blade, heat treating the blade (step 40) may act to, for example, reduce the amount of twist angle correction produced by applying the first angular load to the blade (step 36). Therefore, and as mentioned briefly above, the empirical correlation between a range of angular loads necessary to produce a range of twist angle correction values on which the first angular load is based may account for the reduction in the overcorrected twist angle caused by heat treating the blade (step 40). As described in the copending application entitled "METHOD FOR DEVELOPING A REPAIR PROCESS TO CORRECT A DEFORMED GAS TURBINE ENGINE COMPONENT" U.S. application Ser. No. 12/082,865), repairing the turbine blade may necessitate post twist angle correction processing that tends to change the amount of correction produced by the applied load, such as heat treating the blade to reduce residual stresses (step 40) created during the twisting step. Heat treating the blade (step 40) may have the secondary effect of causing the blade to "un-twist" slightly, thereby partially undoing the twist correction. In such cases, the correlation between applied load and twist angle correction on which the first angular load applied to the blade (step 36) is based may be adjusted to "over-twist" the blade enough to account for the un-twisting caused by heat treatment.

Method 30 also includes measuring a repaired twist angle of the blade (step 42), which measurement may be made, as with the existing and overcorrected twist angle measurements, using a twist angle gauge configured to engage one or more portions of the blade. The repaired twist angle of the blade measured (step 42) is equal to the overcorrected twist angle produced by applying the first angular load to the blade (step 36) reduced by heat treating the blade (step 40).

Methods according to the present invention, such as method 30 of FIG. 2, may be carried out using a variety of repair apparatuses, such as the repair apparatuses disclosed in the copending application entitled "TURBINE BLADE TWIST ANGLE CORRECTION TOOLING" U.S. application Ser. No. 12/082,896.

Methods of correcting blade twist angle according to the present invention have several advantages over known repairs. Embodiments of the present invention include critical repair process inputs, e.g. the magnitude of angular load applied to an untwisted gas turbine blade, necessary to produce target repair process outputs, e.g. the twist angle correction produced in the blade from the applied load, while simultaneously substantially reducing the risk of deleterious effects of the repair, such as initiating micro-cracking in the blade. Methods according to the present invention also account for repair process steps that affect the twist angle corrections produced by the applied loads, such as the untwisting effect of post twist correction heat treatment. Embodiments of the present invention therefore include repair processes, which are less subject to, for example, ad-hoc operator application, production of unacceptable structural imperfections, and over-twisting the turbine blade under repair.

Although the present invention has been described with reference to preferred embodiments, workers skilled in the art will recognize that changes may be made in form and detail without departing from the spirit and scope of the invention.

The invention claimed is:

1. A method of correcting a twist angle of a gas turbine engine blade, the method comprising:
    measuring an existing twist angle of the blade;
    applying a first angular load to a first end of the blade; and
    measuring a repaired twist angle of the blade;
    wherein the first angular load applied to the first end of the blade is based on an empirical correlation between a plurality of angular loads necessary to produce a plurality of twist angle correction values with a reduced risk of introducing structural imperfections, the empirical correlation including:
        determining one or more peak stress locations;
        applying a plurality of loads to a plurality of sample components to produce a plurality of geometrical correction values in the samples;
        generating data from the samples that includes the loads applied and the geometrical correction values produced; and
        analyzing the samples at the peak stress locations for one or more structural imperfections.

2. The method of claim 1, wherein the first end of the blade is one of a tip or a root of the blade.

3. The method of claim 1 further comprising restraining a second end of the blade prior to applying the first angular load to the first end of the blade.

4. The method of claim 3, wherein the first end of the blade is a tip of the blade and the second end of the blade is a root of the blade.

5. The method of claim 4, wherein restraining the root of the blade comprises clamping the root of the blade in a fixture.

6. The method of claim 1, wherein the existing and repaired twist angles are measured using a twist angle gauge configured to engage one or more portions of the blade.

7. The method of claim 1, wherein applying a first angular load to a first end of the blade produces an overcorrected twist angle in the blade.

8. The method of claim 7 further comprising measuring the overcorrected twist angle of the blade.

9. The method of claim 1 further comprising:
    heat treating the blade to reduce residual stresses in the blade;
    wherein heat treating the blade changes the repaired twist angle of the blade and the empirical correlation accounts for changes in the repaired twist angle of the blade caused by heat treating the blade.

10. The method of claim 9, wherein heat treating the blade comprises subjecting the blade to a range of temperatures for prescribed periods of time.

11. A method of correcting a twist angle of a gas turbine engine blade, the method comprising:
    measuring an existing twist angle of the blade;
    applying a first angular load to a tip of the blade to produce an overcorrected twist angle in the blade, wherein the first angular load applied to the tip of the blade is based on an empirical correlation between a plurality of angular loads necessary to produce a plurality of twist angle correction values with a reduced risk of introducing structural imperfections, the empirical correlation including:
        determining one or more peak stress locations;
        applying a plurality of loads to a plurality of sample components to produce a plurality of geometrical correction values in the samples;
        generating data from the samples that correlates the loads applied and the geometrical correction values produced; and
        analyzing the samples at the peak stress locations for one or more structural imperfections;
    measuring the overcorrected twist angle of the blade;
    heat treating the blade to reduce residual stresses in the blade; and
    measuring a repaired twist angle of the blade.

12. The method of claim 11, wherein heat treating the blade reduces the overcorrected twist angle of the blade.

13. The method of claim 12, wherein the empirical correlation accounts for the reduction in the overcorrected twist angle caused by heat treating the blade.

14. The method of claim 13, wherein the repaired twist angle is equal to the overcorrected twist angle reduced by heat treating the blade.

15. The method of claim 11, wherein heat treating the blade comprises subjecting the blade to a range of temperatures for prescribed periods of time.

16. The method of claim 11 further comprising restraining a root of the blade prior to applying the first angular load to the tip of the blade.

17. The method of claim 11, wherein restraining a root of the blade comprises clamping the root of the blade in a fixture.

18. The method of claim 11, wherein the existing, overcorrected, and repaired twist angles are measured using a twist angle gauge configured to engage one or more portions of the blade.

19. A method of correcting a twist angle of a gas turbine engine blade, the method comprising:
    restraining a root of the blade;
    measuring an existing twist angle of the blade;
    applying a first angular load to a tip of the blade to produce an overcorrected twist angle in the blade, wherein the first angular load applied to the tip of the blade is based on an empirical correlation between a plurality of angular loads necessary to produce a plurality of twist angle correction values with a reduced risk of introducing structural imperfections, the empirical correlation including:

determining at least one peak stress location;

applying a plurality of loads to a plurality of sample components to produce a plurality of geometrical correction values in the samples;

generating data from the samples that includes the loads applied and the geometrical correction values produced; and analyzing the samples at the at least one peak stress location for a structural imperfection;

measuring an overcorrected twist angle of the blade;

heat treating the blade to reduce residual stresses in the blade, wherein heat treating the blade reduces the overcorrected twist angle of the blade and the empirical correlation accounts for the reduction in the overcorrected twist angle caused by heat treating the blade; and measuring a repaired twist angle of the blade, wherein the repaired twist angle is equal to the overcorrected twist angle reduced by heat treating the blade.

20. The method of claim 19, wherein restraining a root of the blade comprises clamping the root of the blade in a fixture.

21. The method of claim 19, wherein the first angular load is applied to the tip of the blade using a twist angle correction tool.

22. The method of claim 19, wherein the existing, overcorrected, and repaired twist angles are measured using a twist angle gauge configured to engage one or more portions of the blade.

23. The method of claim 19, wherein heat treating the blade comprises subjecting the blade to a range of temperatures for a period of time.

* * * * *